(12) United States Patent
Koopmann et al.

(10) Patent No.: US 9,394,045 B2
(45) Date of Patent: Jul. 19, 2016

(54) PROPELLER SOUND FIELD MODIFICATION SYSTEMS AND METHODS

(71) Applicant: KCF TECHNOLOGIES, INC., State College, PA (US)

(72) Inventors: Gary H. Koopmann, Alexandria, VA (US); Michael D. Grissom, State College, PA (US)

(73) Assignee: KCF TECHNOLOGIES, INC., State College, PA (US)

( * ) Notice: Subject to any disclaimer, the term of this patent is extended or adjusted under 35 U.S.C. 154(b) by 565 days.

(21) Appl. No.: 13/919,595

(22) Filed: Jun. 17, 2013

(65) Prior Publication Data

US 2015/0125268 A1    May 7, 2015

Related U.S. Application Data

(60) Provisional application No. 61/802,205, filed on Mar. 15, 2013.

(51) Int. Cl.
*B64C 11/00* (2006.01)
*B64C 27/00* (2006.01)

(52) U.S. Cl.
CPC .......... *B64C 11/001* (2013.01); *B64C 2220/00* (2013.01); *F05D 2260/96* (2013.01)

(58) Field of Classification Search
CPC . B64C 2220/00; B64C 11/008; F04D 29/665; H04R 2440/07
See application file for complete search history.

(56) References Cited

U.S. PATENT DOCUMENTS

| 3,685,610 | A | 8/1972 | Bschorr |
| 4,934,483 | A | 6/1990 | Kallergis |
| 5,314,308 | A | 5/1994 | Reed, III |
| 7,992,674 | B2 | 8/2011 | Gorny et al. |
| 8,070,092 | B2 | 12/2011 | Bouldin et al. |
| 2010/0264264 | A1* | 10/2010 | Gall .......................... B64C 3/10 244/1 N |

* cited by examiner

*Primary Examiner* — Eric Keasel
*Assistant Examiner* — Jason Davis
(74) *Attorney, Agent, or Firm* — Oliff PLC

(57) ABSTRACT

A propeller system for an aircraft includes an assembly for modifying a sound field of the propeller system. The propeller system includes a rotor supported for rotation about a rotor axis. The rotor has a central hub and a plurality of blades each extending outwardly from the hub to a tip. The rotor and blades are operable to propel an aircraft to travel in a direction. The rotor blades define a rotor plane perpendicular to the rotor axis. The blade tips define a circumferential rotational path as the blades are rotated by the rotor. The propeller system includes an acoustic resonator or multiple resonators having openings disposed within a distance to the propeller blade tip that is small compared to the wavelength of the propeller's fundamental blade tone and proximate to the rotor plane. The resonators are excited by tip flow of the blade as it passes the opening. The acoustic resonators are configured and positioned so as to direct acoustic energy to modify the sound field of the propeller system at blade pass or higher harmonic frequency tones in a desired direction relative to the aircraft.

22 Claims, 10 Drawing Sheets

PROPELLER SOUND FIELD MODIFICATION SYSTEMS AND METHODS

CROSS-REFERENCE TO RELATED APPLICATION

This application claims the benefit of U.S. Provisional Patent Application No. 61/802,205, having a filing date of 15 Mar. 2013, which is hereby incorporated by reference.

GOVERNMENT LICENSE RIGHTS

This invention was made with United States government support under U.S. Navy SBIR Award No. N68936-11-C-0017. The government has certain rights in this invention.

TECHNICAL FIELD

The present disclosure relates generally to propeller sound field modification and, more specifically, to systems and methods for modifying the sound field of an aircraft propeller.

BACKGROUND

It is common knowledge that propeller systems, for example, aircraft propeller systems, pushers, tractors, and tail rotors, generate a noise signature. It is generally desirable to reduce the noise signature of propellers. As noted in U.S. Pat. No. 7,992,674, the disclosure of which is incorporated herein, noise generated by propeller systems has both broadband and tonal components. Tonal noise results from propeller blade interactions with time-invariant flow distortions. When spectrally dominant, blade tones are of primary concern in noise control applications due to their particular annoyance.

The noise problem is particularly acute for surveillance aircraft and drones that must avoid detection or creating a nuisance near populated areas. Several conventional techniques have been used to reduce propeller noise, but they all tend to reduce the efficiency of the propeller. Some conventional noise control techniques include, increasing the number of blades, slowing the rotating speed of the propeller, and shaping the blades for minimum noise creation.

Prior approaches used to reduce blade tone sound pressure levels (SPLs) have utilized both active and passive noise control methods. Passive blade alterations, such as rotor/stator spacing in axial fans, leaning, sweeping or contouring, numbering, and irregular circumferential blade spacing, have been demonstrated effective for fan noise reduction. Few passive approaches have demonstrated the ability to reduce blade tone noise locally in the blade region with minimal impact on fan efficiency.

The concept of noise cancellation by introducing secondary sources or resonant systems is a well understood and implemented concept. Obstructions, such as cylindrical rods, can be placed in the near field of a rotor to generate an anti-phase secondary sound field that can then be tuned to reduce blade tone noise. However, difficulty in tuning the response of these interactions often limits their usefulness. Active noise control approaches have been used for blade tone noise reduction, e.g., introducing active secondary sources into the existing sound field of an axial fan. Conventional active approaches have used loudspeaker arrays to reduce levels of fan noise propagating down a duct. Due to the associated weight and non-compactness of loudspeakers, piezoelectric actuators have been used more recently as acoustic transducers imbedded into the stator vanes of axial fans to reduce tonal noise propagations. Air injections, either positioned to generate secondary sources through interaction with the rotor blades or used to improve flow non-uniformities generated by a body in a flow field, have been shown to reduce tonal noise. These approaches have proven effective in a laboratory setting, but are generally prohibitively expensive and potentially unreliable in most actual axial fan applications.

The first known implementation of flow-driven resonator source was to generate a canceling sound field that reduced fan noise generated by a centrifugal blower. More recently, as disclosed in U.S. Pat. No. 7,992,674, a method of using resonators as flow driven secondary sources has been developed for axial fans. This method behaves as a quasi-active source cancellation wherein fluid flow interacts with a resonator as a means of generating an acoustic source.

The application to propellers, especially open (non-shrouded) propellers, and specifically aircraft propellers has not been addressed for various reasons. As will be discussed in more detail below, when cancelling propeller tones with an acoustic resonator, the combination of primary and secondary sound sources tends to create spatial patterns of quiet zones and loud zones. Aircraft applications are somewhat unique in that the aircraft, in flight, is generally in an acoustic free-field (i.e., no reflective bodies nearby). In fact, the sound that is projected upward, away from the ground, is usually of no concern. Propellers also have a very directional sound field. As a result, a noise "reduction" solution can be applied that targets the directional sound field of the propeller but may increase the sound in some directions.

A key barrier to implementing sound cancellation methods in aircraft is the added weight. For previous systems, the weight penalty has generally been too high for the acoustic performance gains.

It may be desirable to provide a propeller system with a flow-driven acoustic resonator for modifying or shaping the sound field of a propeller system of an aircraft. It may be desirable to provide a system where the propeller is unaltered and the potential noise reduction in a desired direction is significant. It may also be desirable to provide a propeller sound field modification system that can be integrated into existing aircraft structures such that any additional weight or drag due to the implementation will be relatively nominal. It may be desirable to provide a secondary sound source that accommodates relative motion of the propeller to the aircraft structure with flexible components.

SUMMARY OF THE INVENTION

In one aspect of the disclosure, a propeller system for an aircraft includes an assembly for modifying a sound field of the propeller system. The propeller system includes a rotor supported for rotation about a rotor axis. The rotor has a central hub and a plurality of blades each extending outwardly from the hub to a tip. The rotor and blades are operable to propel an aircraft to travel in a direction. The rotor blades define a rotor plane perpendicular to the rotor axis. The blade tips define a circumferential rotational path as the blades are rotated by the rotor. The propeller system includes an acoustic resonator having an opening disposed within a distance to the propeller blade tip that is small compared to the wavelength of the propeller's fundamental blade tone and proximate to the rotor plane. The resonator is excited by tip flow of the blade as it passes the opening. The acoustic resonator is configured and positioned so as to direct acoustic energy to modify the sound field of the propeller system at blade pass or higher harmonic frequency tones in a desired direction relative to the aircraft.

According to some aspects, a method for modifying a sound field of a propeller system of an aircraft may include receiving data representing an acoustic profile of a propeller system of an aircraft; receiving real-time data indicating a propeller speed, orientation of the aircraft, and a weather condition surrounding the aircraft; determining a desired modification to the acoustic profile based on the received real-time data; and tuning an acoustic resonator to achieve the desired modification to the acoustic signature of the propeller system.

DETAILED DESCRIPTION

Reference will now be made in detail to specific embodiments or features, examples of which are illustrated in the accompanying drawings. Generally, corresponding or similar reference numbers will be used, when possible, throughout the drawings to refer to the same or corresponding parts.

The present invention provides an acoustic resonator configuration for use with or as part of a propeller system so as to provide modification of propeller fan noise propagation and/or shaping of a propeller sound field. In some aspects, the acoustic resonator may cancel the entirety or a substantial portion of the tonal component of noise from the propeller in one or more directions.

Figure 1:
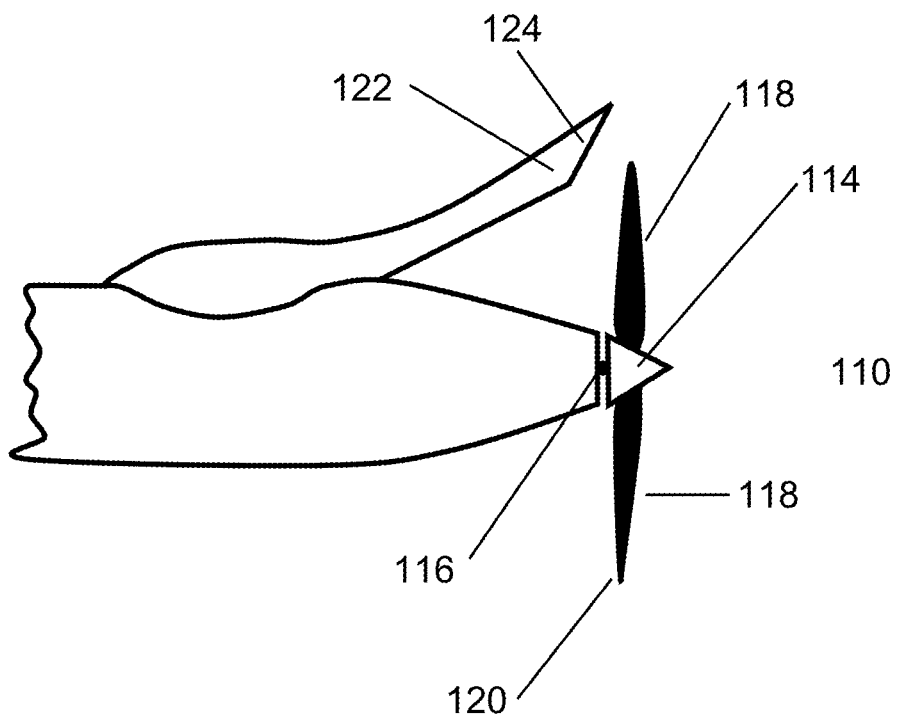
FIG. 1 is a side view of an exemplary propeller system in accordance with various aspects of the disclosure.

Referring to FIG. 1, a propeller system 110 according to an embodiment of the present disclosure includes a rotor 114 rotatable about a rotor axis A. As shown, the rotor 114 has a central hub 116 and a plurality of rotor blades 118 extending outwardly from the hub 116 to tips 120. The rotor blades 118 may be said to define and generally be disposed along a rotor plane R. The rotor plane R is generally at the midpoint of the rotor blades and perpendicular to the rotor axis A about which the rotor rotates.

The system 110 further includes at least one acoustic resonator 122 as a secondary sound source to modify and/or shape the tonal output of the axial propeller system 110. For example, in some aspects, the resonator 122 may modify or shape the sound field of the propeller system 110 or, in some aspects, attenuate or cancel a component of the tonal output of the propeller system 110. The resonator 122 is driven by airflow across an opening 124 of the resonator. The airflow is generated by the passing fan blade tips 120 as they are rotatably driven by the rotor 114. The airflow across the opening 124 causes the resonator 122 to create a tone or sound with a frequency, a phase, and a magnitude. As will be clear to those of skill in the art, the resonator 122 may be configured to create a tone operable to reduce the blade pass frequency tone of the propeller system due to noise cancellation between the resonator tone and the propeller system tone.

As shown in the embodiment of FIG. 1, the resonator 122 may be configured as a streamlined, hollow-cavity structure that produces a single secondary source near the propeller blade tips 120. While the acoustic resonator 122 may take various forms other than shown, the illustrated embodiment uses a closed ended tubular resonator having an opening 124 close enough to the passing rotor blade tips 120 to insure that the resonator is sufficiently driven by airflow at the appropriate source strength. Generally, it is counterintuitive to place structures and/or components close to a propeller, since structures close to the propeller will tend to make the propeller less efficient and louder.

Figure 7:
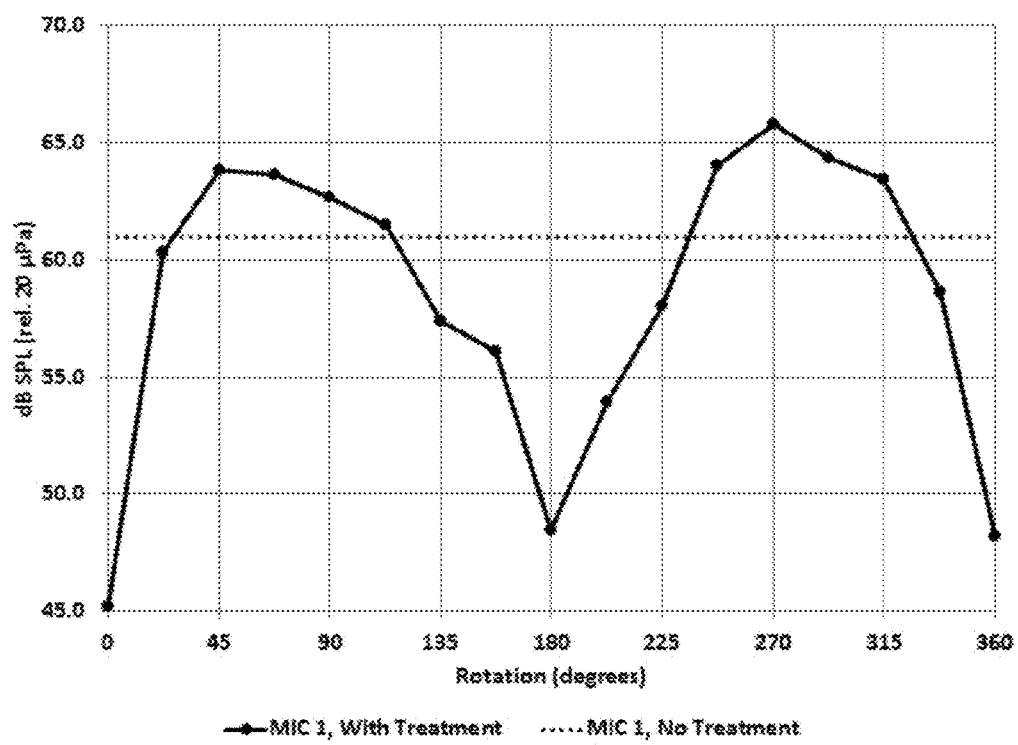
FIG. 7 is a graph that shows the directivity of the propeller measured in the plane of the rotor in the far field showing the variation of the sound pressure level.
Figure 8:
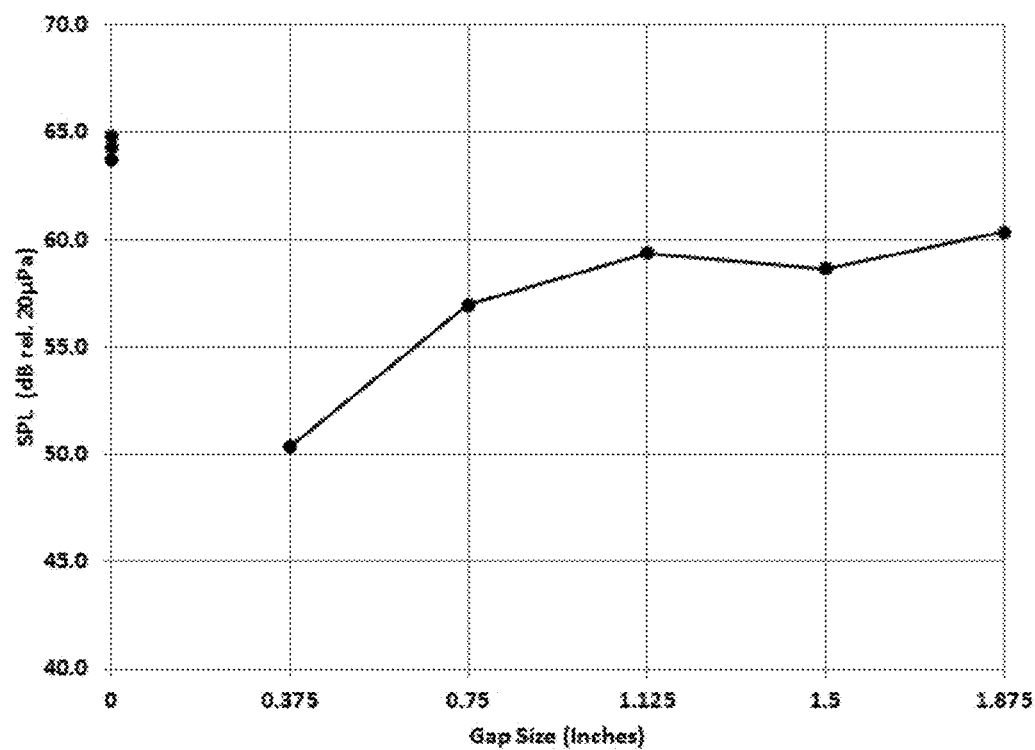
FIG. 8 is a graph that shows a fixed point in the far field pressure level of the propeller relative to the distance of the resonator opening from the blade tip.

Referring to FIG. 7, the resultant sound level created by the propeller system combined with a secondary source located close to the propeller blade tips 120 is illustrated. The sound level is measured in the plane R and in the acoustic far field (a distance of several acoustic wavelengths of the fundamental blade tone) of the propeller blades at different angles relative to the secondary source. Note that some directions yield a decrease in sound pressure, and some yield an increase in sound pressure. FIG. 8 shows the amplitude of the propeller noise level measured at a location as the amplitude of a secondary source is changed by moving it farther from the propeller blade tips 120. The data point at 0 is the noise level without a secondary source.

Figure 2:
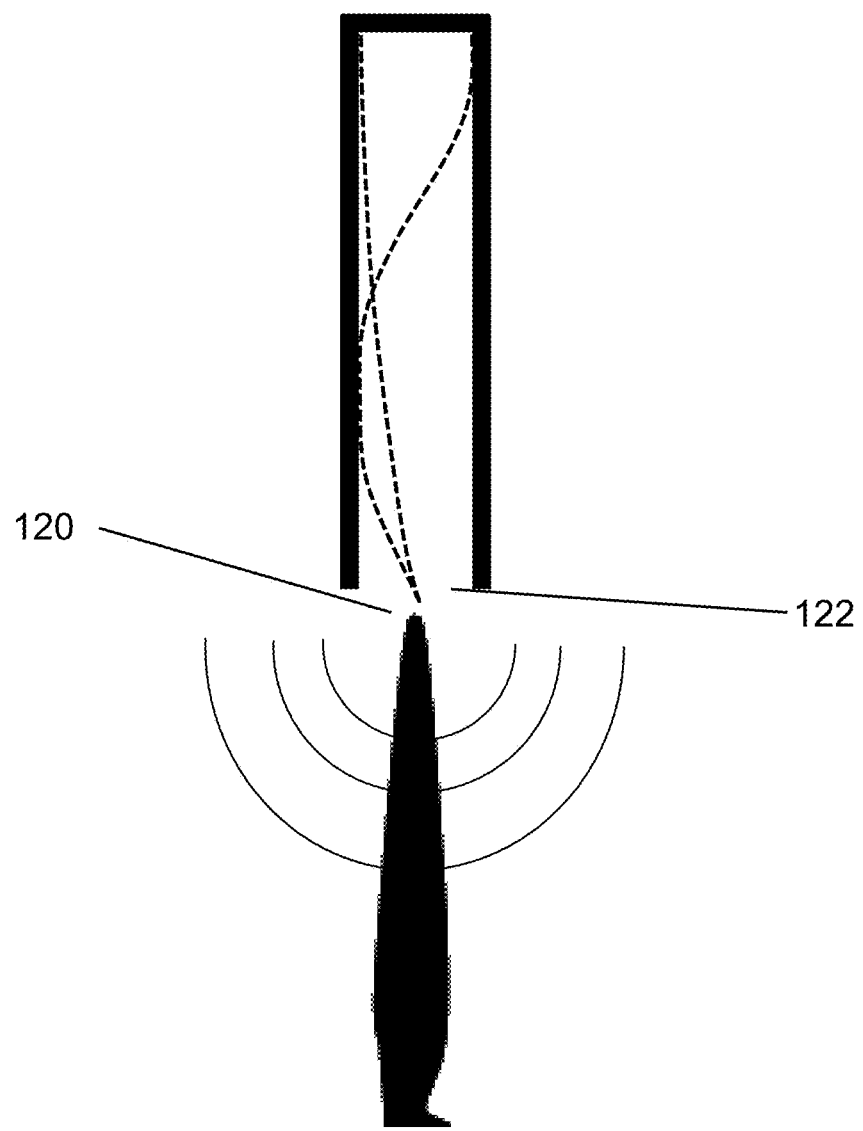
FIG. 2 illustrates how a passing propeller blade tip excites a resonator.

FIG. 2 illustrates the mechanism by which such an acoustic resonator is driven by passing fan blades. The conventional use of resonators is described, for example, in U.S. Pat. No. 6,454,527. According to the present disclosure, the passing blade tips 120 generate periodic pressure fluctuations at the mouth or opening 124 of the resonator 122, thereby forcing a resonator response.

Figure 3:
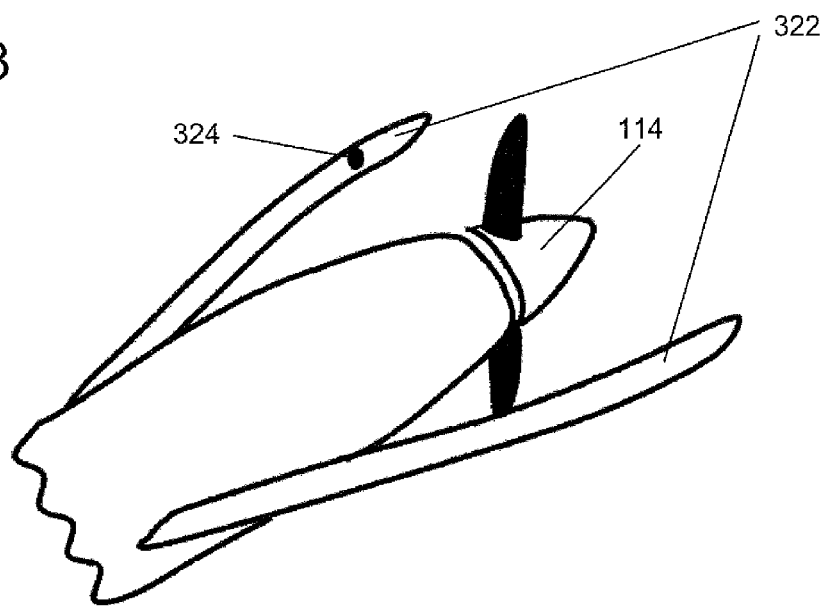
FIG. 3 is a perspective view of an exemplary propeller system in accordance with various aspects of the disclosure.
Figure 4:
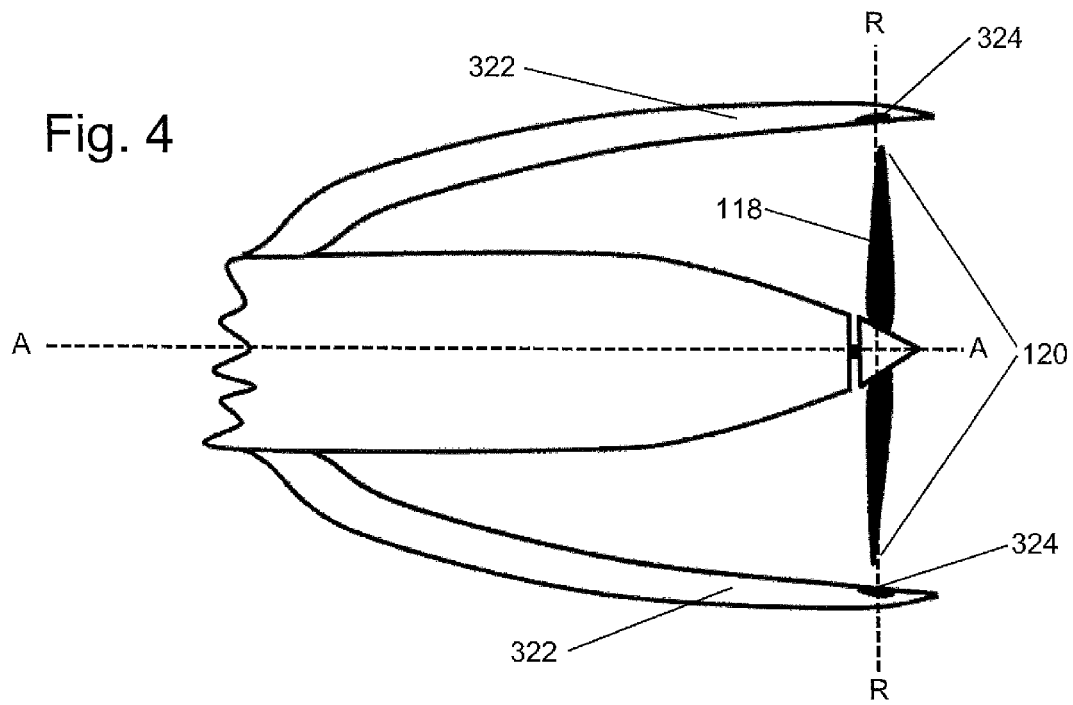
FIG. 4 is a top view of an exemplary propeller system in accordance with various aspects of the disclosure.

Referring now to FIGS. 3 and 4, a pair of resonators 322 are disposed adjacent the circumferential path of the rotor blade tips 120. The openings 324 of the resonators 322 may be said to be on opposite sides of the rotor 114 in the rotor plane R. Alternatively, the resonator openings 324 may be positioned differently than shown.

As will be understood by those of skill in the art, the length of the resonators depends on the resonance frequency required to modify and/or shape the resultant propeller sound field. For example, for flow-driven resonators, preferred resonator lengths are ¼ wavelength and odd multiples thereof. As known to those of skill in the art, the dominant tone of typical propellers occurs at the blade pass frequency. The resonators 122, 322 may be tuned so as to provide a sound source operable to cancel at least a portion of the blade pass frequency tone in at least one direction perpendicular and oblique to the flow direction.

Propeller systems typically have very directional sound fields. As a result, for aircraft, a noise "reduction" solution can be applied that targets a directional sound field of the propeller but actually increases the sound in some directions. The spatial distribution of the sound field may be controlled by altering the phase and amplitude of the secondary sources relative to the unwanted propeller noise. There are different techniques to control the phase and amplitude depending on the method used to generate the sound. For acoustic resonators, the location, damping, shape of, and number of resonant structures will determine the secondary sound field that can be generated to modify and/or shape the spatial noise map of the propeller system.

The acoustic resonators 122, 322 have a resonance frequency which can be tuned to be near to the primary blade pass frequency for a maximum response. In some embodiments, the resonance frequency is within 10% of the blade pass frequency.

Figure 5:
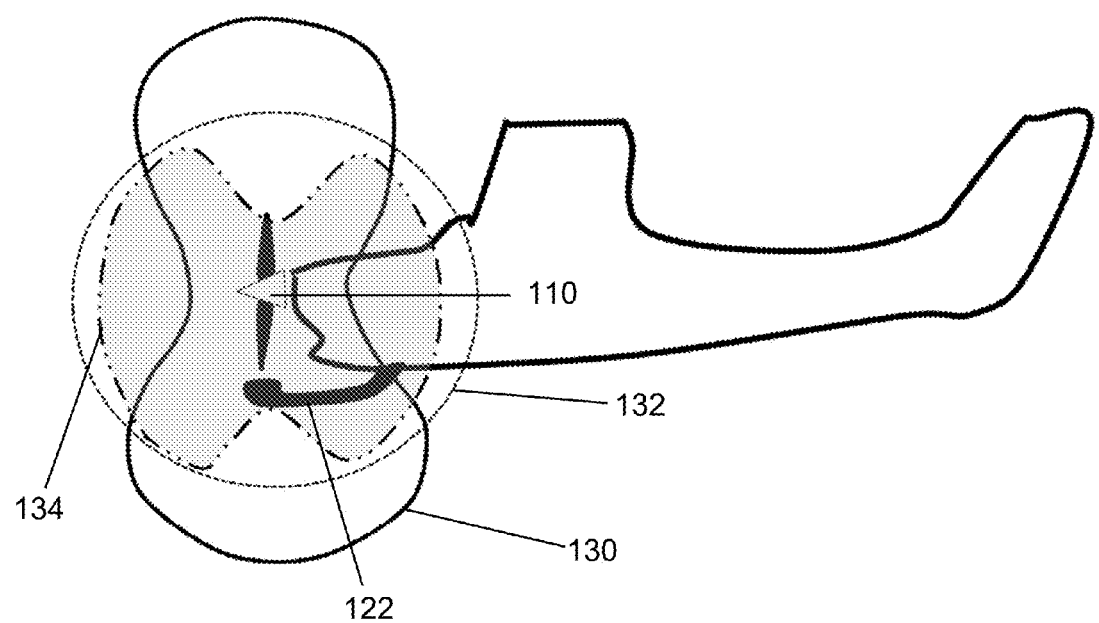
FIG. 5 is a diagrammatic view illustrating a modified sound field of a propeller system in accordance with various aspects of the disclosure.

FIG. 5 illustrates cancellation of sound waves using a properly tuned system. The original sound signal generated by the propeller system 110 is shown at 130. The output of the sound source created by the resonator 122 is shown at 132. The output of the resonator 122 is nearly in anti-phase with the original sound, thereby cancelling at least a portion of the original signal. The resulting sound wave is shown at 134. As will be clear to those of skill in the art, FIG. 5 illustrates the changes in sound directivity diagrammatically. It can be seen that the source reduces the amplitude of the sound in one direction but actually amplifies it in the other.

It should be appreciated by persons of skill in the art that the blade pass frequency of a propeller system depends on the rotational speed of the rotor. In many applications the speed is predetermined. That is, the propeller system is designed such that the rotational speed of the rotor is a constant predetermined speed. For applications such as these, a resonator with a predetermined resonance frequency may be used to provide resonator configuration in accordance with the present disclosure. For example, the resonator configuration may be determined by a predetermined length of a quarter-wavelength resonator, which of course includes resonance frequencies at ¾ wavelength, 5/4 wavelength, etc., (e.g., odd multiples of ¼). Therefore, for purposes of this disclosure, "a quarter-wavelength resonator" is defined as having a length of one-quarter wavelength and any odd multiple thereof.

In other applications, it may be desirable to provide a resonator with adjustable characteristics since the demands on the system will change for changing flight conditions. Specifically, the system will need to be tunable to changing speed of the propeller, orientation of the aircraft, and environmental changes for the greatest practical effectiveness. The geometry of the structure of the acoustic resonator must be altered to match the changing conditions.

Tuning of acoustic devices in other realms is common—musical instruments, mufflers, and cavity resonators used in wall construction are examples. Some methods for structural tuning include changing the acoustic length by moving the back wall of a tube structure (e.g., trombone style of tuning); varying hole locations (e.g., flute style of tuning); and varying the number or area of holes. According to various aspects of this disclosure, two levels of implementation and activation are available: external tuning, where a signal is received by the system to manually tune the system; or embedded tuning, where the tuning is performed automatically by embedded electronics and sensors and actuators. An embedded system would entail sensors for propeller speed, air temperature, orientation, and tuning status; a microprocessor to control the system; actuator(s) to adjust the tuning of the structure; an algorithm to translate the sensor readings into an output; and an energy source.

Figure 6:
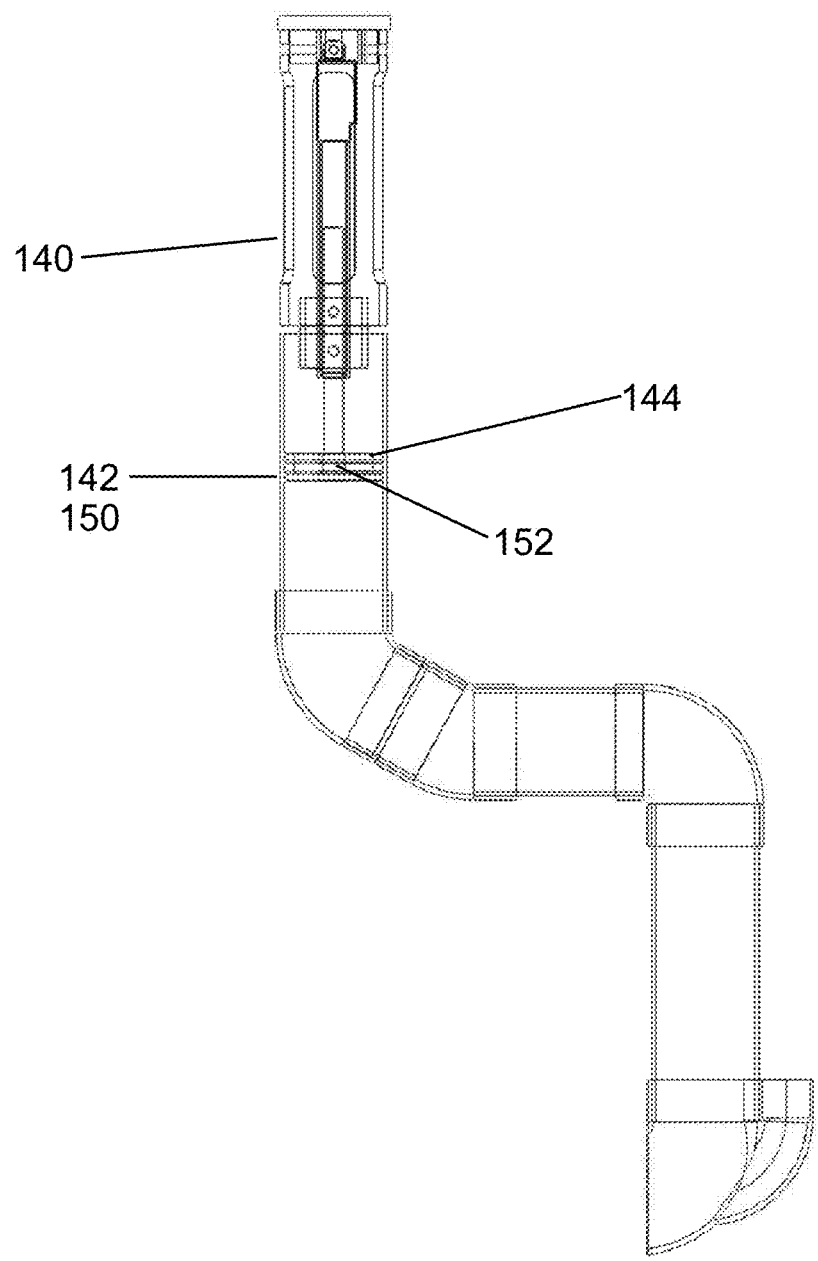
FIG. 6 is a partially-open side view of an exemplary acoustic resonator in accordance with various aspects of the disclosure.

FIG. 6 illustrates an optional adjusting mechanism 140 at the end of a resonator tube. The adjusting mechanism 140 is operable to adjust the internal length of the tube. The adjustable mechanism 140 may include an adjustable wall 142 movable by a piston arrangement 144 operable to move the wall 142 to adjust the impedance of the resonator, as would be understood by those of skill in the art. The resonator may include an end wall 150 with a microphone assembly 152 which may be included for feedback or tuning purposes. The configuration of FIG. 6 may be used for initially tuning a resonator system or for actively adjusting the characteristics of the resonator in operation, such as with a variable speed propeller system. Other approaches for adjusting the resonance frequency or other characteristics of the resonators will be understood by those of skill in the art.

Systems and methods for modifying the acoustic signature of an aircraft will now be described. U.S. Pat. No. 8,036,821, which is incorporated herein by reference in its entirety, describes exemplary systems and methods for modeling the acoustics of a vehicle and the vehicle's surroundings.

Figure 11:
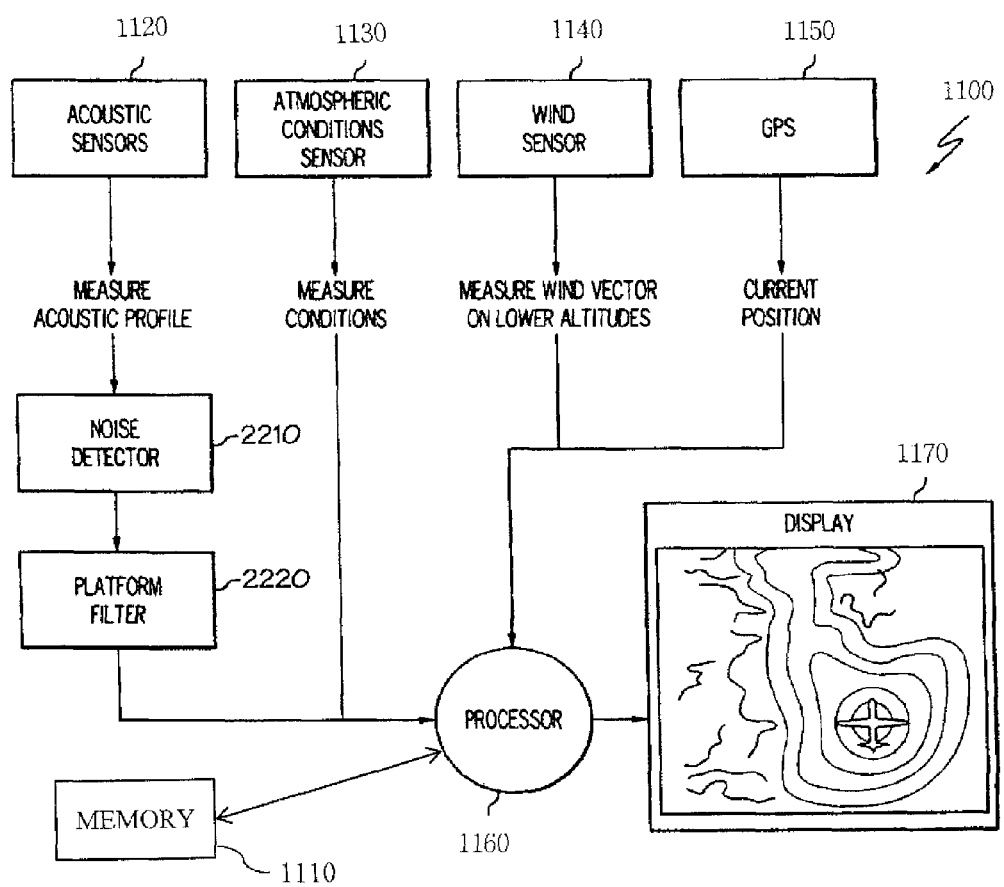
FIG. 11 is a block diagram of an exemplary system for modifying the sound field of an aircraft in real-time while the vehicle is in operation.

FIG. 11 is a block diagram of a system 1100 for modifying the acoustic signature of an aircraft in real-time while the vehicle is in operation. System 1100 includes memory 1110, one or more acoustic sensors 1120, one or more atmospheric conditions sensors 1130, one or more wind sensors 1140, and a global positioning system (GPS) 1150, each being coupled to a processor 1160. System 1100 may also include a display 1170 coupled to processor 1160.

Memory 1110 may be any hardware, device, logic, and/or firmware capable of storing computer data, computer code, computer-executable instructions, computer programs, and/or the like for retrieval and/or use by processor 1160. The acoustic signature of the aircraft's propeller system, map/geographic data, terrain data, and/or the weather data, among other things, may be stored in memory 1110.

Each acoustic sensor 1120 may be any hardware and/or device capable of detecting the acoustic profile of the environment surrounding the vehicle while the vehicle is en route to the destination. In one embodiment, acoustic sensor 1120 comprises a noise detector 2210 and a vehicle noise filter 2220. Noise detector 2210 may be any hardware and/or device capable of detecting sound or noise in the environment surrounding the vehicle. Vehicle noise filter 2220 may be any hardware and/or device capable of filtering out the noise emitted by the vehicle while the vehicle is operating in the environment so that the amount of background noise in the environment surrounding the vehicle can be determined.

Atmospheric conditions sensor(s) 1130 may be any hardware and/or device capable of detecting the actual weather conditions surrounding the vehicle while the vehicle is en route to the destination. For example, atmospheric conditions sensor 1130 may detect air temperature, air density, air pressure, turbulence, humidity, precipitation, and/or any other condition that may amplify, dampen, block, and/or propagate sound emitted from the vehicle.

Each wind sensor 1140 may be any hardware and/or device capable of detecting the wind velocity and direction at one or more altitudes while the vehicle is en route to the destination. In one embodiment, wind sensor 1140 comprises a Light Detection and Ranging (LIDAR) system for measuring the wind velocity and direction. In another embodiment, wind sensor 1140 comprises a Laser Detection and Ranging (LADAR) system for measuring the wind velocity and direction.

GPS 1150 may be any hardware and/or device capable of detecting the present position and tracking the position of the vehicle while the vehicle is en route to the destination. Global positioning systems are well-known in the art, and therefore, the details of GPS 1150 need not be described herein.

It should be appreciated that the system 1100 may include additional conventional sensors for detecting and/or measuring the rotational speed of the propeller, the speed of the aircraft, orientation of the aircraft, and the like. For example, accelerometers, gyroscopes, or the like may be used to measure the orientation or attitude of the aircraft. In some aspects, the GPS 1150 may be used to measure the speed of the aircraft.

Processor 1160 may be any hardware, device, logic, and/or firmware capable of executing computer code, computer instructions, computer modules, and/or computer programs. Processor 1160 is also configured to receive data from acoustic sensor 1120, atmospheric conditions sensor 1130, wind sensor 1140, and/or GPS 1150 and generate a real-time acoustic profile of the aircraft in relation to the surrounding area while the vehicle is en route to the destination and transmit the real-time acoustic profile to display 1170 for presentation to a user. Accordingly, the operator of the vehicle can then optimally tune an acoustic waveguide to modify the acoustic signature of the aircraft so as to maintain the desired directivity of the acoustic field generated by propeller and resonator in combination.

Figure 9:
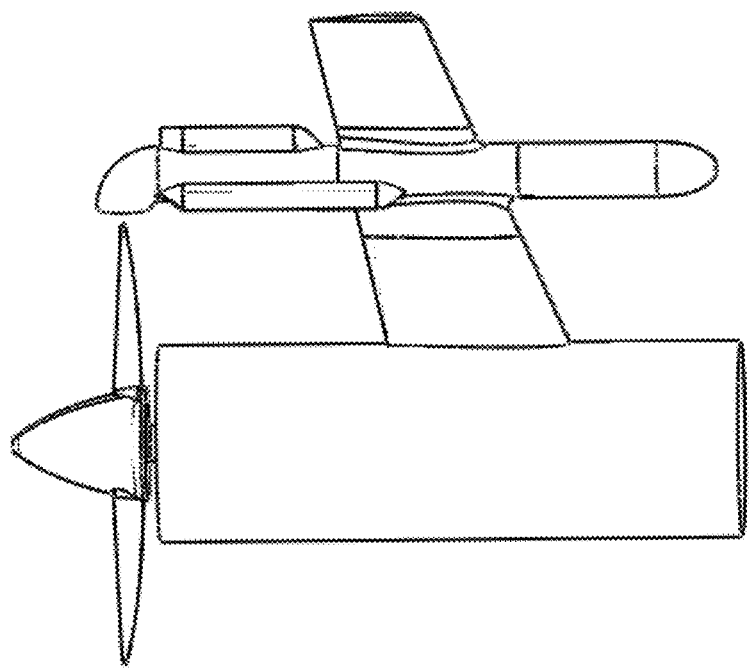
FIG. 9 is a side view of an exemplary propeller system in accordance with various aspects of the disclosure.
Figure 9:
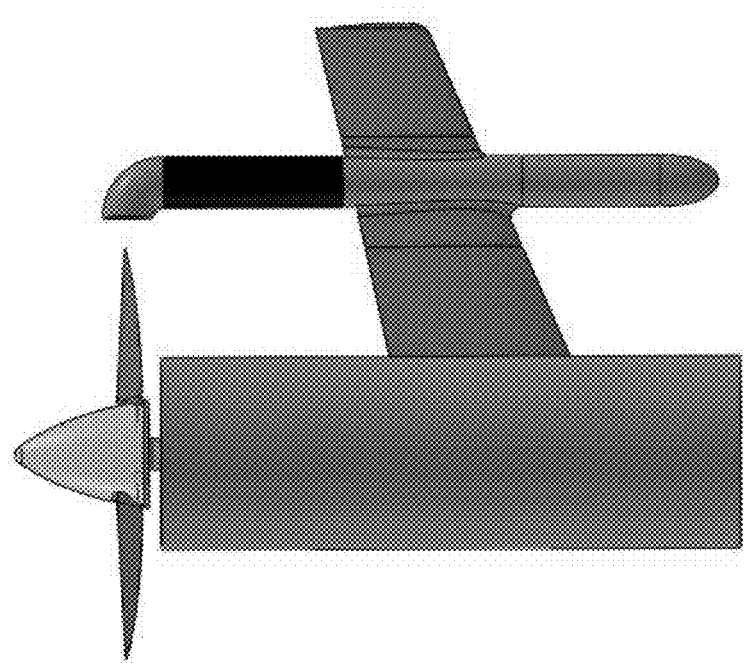
Figure 10:
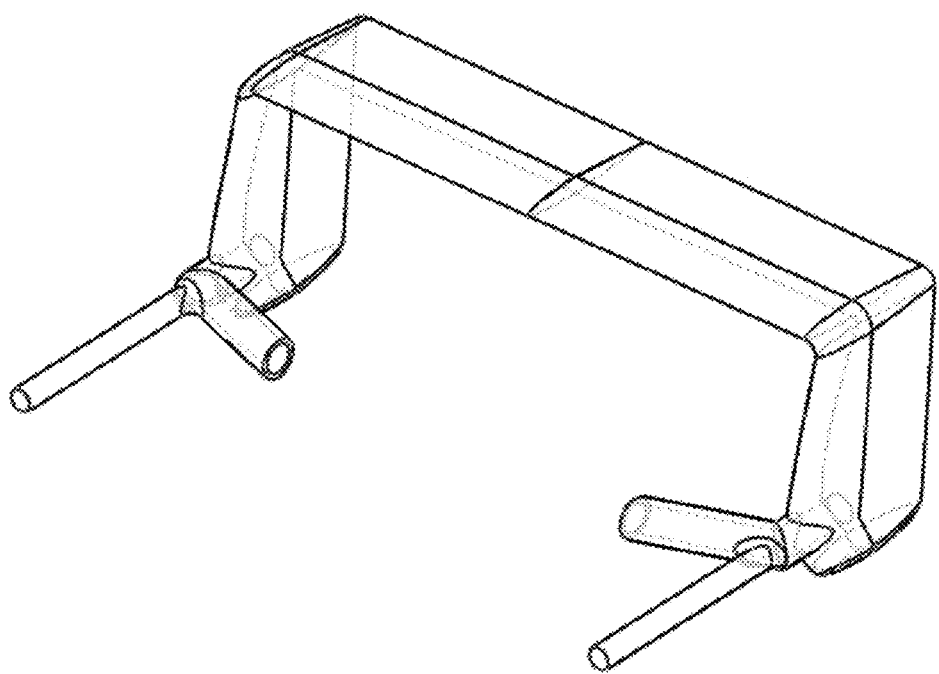
FIG. 10 is a perspective view of an exemplary propeller system in accordance with various aspects of the disclosure.

As shown in FIG. 1, a resonator consistent with the present disclosure may be integrated into a fin of an aircraft. FIGS. 3 and 4 illustrate resonators extending from the fuselage of an aircraft. It should be appreciated that resonators may be integrated into struts (FIG. 9) or provided as a flexible attachment (FIG. 10). It should further be appreciated that the resonators may be coming off the fuselage (the initial figure in the introduction) integrated into a wing, provided as a separate UAV 'slice', or integrated in the tail boom of a helicopter.

As mentioned above, it is counterintuitive to place resonant structures close to the propeller, since they will tend to amplify harmonic noise. However, several techniques may be implemented to reduce this effect, so that a resonant structure can be placed very close to the propeller. One possible implementation is the inclusion of variable impedance walls/sections. For example, a relatively rigid resonator structure may include a rubber section. Another possible implementation is the use of branch resonators, which may comprise small tubes extending from the primary resonator so that the higher harmonics of the quarter wavelength resonator are no longer integer multiples of the fundamental frequency of the blade tones. This feature allows the higher harmonic resonator tones to be decoupled from the higher harmonic blades tones and thus not excited by the passing blade tips. In some aspects, the mouth to the resonator opening may be shaped to alter the harmonic noise; the resonator may include bends; and/or the cross-section or diameter of the resonator may be modified to vary the acoustics of the secondary source. According to some aspects, the height, shape, or material of the back wall of the resonator cavity can be altered. In some aspects, damping materials may be placed in the resonator, and the acoustic damping can be controlled by the location, type, and amount of damping materials. According to various aspects, the system may include multiple resonators tuned to different frequencies.

The first advantage of the invention is that a designer can use the most efficient propeller for the aircraft propulsion system independently of the generated noise. The second advantage is a result of the noise cancellation nature of the solution and the collocation of the secondary sources. Noise cancellation techniques can theoretically eliminate tonal noise sources completely when the secondary source is collocated with the noise source.

From the foregoing, it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A propeller system for an aircraft including an assembly for modifying a sound field of the propeller system, the propeller system comprising:
   a rotor supported for rotation about a rotor axis, the rotor having a central hub and a plurality of blades each extending outwardly from the hub to a tip, the rotor and blades being operable to propel the aircraft to travel in a direction, the rotor blades defining a rotor plane perpendicular to the rotor axis, the blade tips defining a circumferential rotational path as the blades are rotated by the rotor; and
   a single monopole acoustic resonator having an opening disposed within a distance to the propeller blade tip that is smaller than the wavelength of the propeller's fundamental blade tone and proximate to the rotor plane, the single monopole acoustic resonator being excited by tip flow of the blade as it passes the opening, the single monopole acoustic resonator being configured and positioned so as to direct acoustic energy to modify the sound field of the propeller system relative to the aircraft at blade pass or higher harmonic frequency tones.

2. The propeller system of claim 1, wherein the single monopole acoustic resonator comprises a quarter wavelength resonator.

3. The propeller system of claim 1, wherein the rotor is a non-shrouded rotor.

4. An aircraft comprising:
   a fuselage, a fin, a tail, or a wing; and
   the propeller system of claim 1, the opening comprising an opening in the fuselage, the fin, the tail, or the wing.

5. A propeller system for an aircraft including an assembly for modifying a sound field of the propeller system, the propeller system comprising:
   a rotor supported for rotation about a rotor axis, the rotor having a central hub and a plurality of blades each extending outwardly from the hub to a tip, the rotor and blades being operable to propel the aircraft, the rotor blades defining a rotor plane perpendicular to the rotor axis, the blade tips defining a circumferential rotational path as the blades are rotated by the rotor; and
   a first monopole acoustic resonator having an opening disposed proximate the propeller blade tip and a second monopole acoustic resonator having an opening disposed proximate the propeller blade tip, the first monopole acoustic resonator and the second monopole acoustic resonator being spaced apart from one another about the circumferential rotational path of the blade tips in a plane transverse to the rotor axis, the first monopole acoustic resonator and the second monopole acoustic resonator being configured and positioned so as to direct acoustic energy to modify the sound field of the propeller system relative to the aircraft at blade pass or higher harmonic frequency tones.

6. The propeller system of claim 5, wherein the first monopole acoustic resonator and the second monopole acoustic resonator are excited by tip flow of the blade as it passes the opening of the first monopole acoustic resonator and the opening of the second monopole acoustic resonator, respectively.

7. The propeller system of claim 5, wherein the opening of the first monopole acoustic resonator and the opening of the second monopole acoustic resonator are disposed within a distance to the propeller blade tip that is smaller than the wavelength of the propeller's fundamental blade tone and proximate to the rotor plane.

8. The propeller system of claim 5, wherein the first monopole acoustic resonator and the second monopole acoustic resonator each comprise a quarter wavelength resonator.

9. The propeller system of claim 5, further comprising at least one additional monopole acoustic resonator having an opening disposed proximate the propeller blade tip, the first monopole acoustic resonator, the second monopole acoustic resonator, and the at least one additional monopole acoustic resonator being spaced apart from one another about the circumferential rotational path of the blade tips in the plane transverse to the rotor axis, said additional monopole acoustic resonator being configured and positioned so as to direct acoustic energy to modify the sound field of the propeller system relative to the aircraft at blade pass or higher harmonic frequency tones.

10. The propeller system of claim 9, wherein said at least one additional monopole acoustic resonator is excited by tip flow of the blade as it passes the opening of the at least one additional monopole acoustic resonator.

11. The propeller system of claim 9, wherein the opening of the at least one additional monopole acoustic resonator is disposed within a distance to the propeller blade tip that is smaller than the wavelength of the propeller's fundamental blade tone and proximate to the rotor plane.

12. The propeller system of claim 5, wherein the rotor is a non-shrouded rotor.

13. An aircraft comprising:
a fuselage, a fin, a tail, or a wing; and
the propeller system of claim 5, the at least one of the first opening and the second opening comprising an opening in the fuselage, the fin, the tail, or the wing.

14. A method for modifying a sound field of an aircraft propeller system, the method comprising:
propelling an aircraft to travel in a direction by rotating a rotor and a plurality of blades about a rotor axis, the rotor having a central hub and the blades each extending outwardly from the hub to a tip, the rotor blades defining a rotor plane perpendicular to the rotor axis, the blade tips defining a circumferential rotational path as the blades are rotated by the rotor; and
directing acoustic energy, via a single monopole acoustic resonator having an opening disposed within a distance to the propeller blade tip that is smaller than the wavelength of the propeller's fundamental blade tone and proximate to the rotor plane, the single monopole acoustic resonator being excited by tip flow of the blade as it passes the opening, the single monopole acoustic resonator being configured and positioned so as to direct acoustic energy to modify the sound field of the propeller system relative to the aircraft at blade pass or higher harmonic frequency tones.

15. The method of claim 14, wherein the single monopole acoustic resonator comprises a quarter wavelength resonator.

16. A method for modifying a sound field of an aircraft propeller system, the method comprising:
propelling an aircraft to travel in a direction by rotating a rotor and a plurality of blades about a rotor axis, the rotor having a central hub and the blades each extending outwardly from the hub to a tip, the rotor blades defining a rotor plane perpendicular to the rotor axis, the blade tips defining a circumferential rotational path as the blades are rotated by the rotor; and
directing acoustic energy, via a first monopole acoustic resonator having an opening disposed proximate the propeller blade tip and a second monopole acoustic resonator having an opening disposed proximate the propeller blade tip, the first monopole acoustic resonator and the second monopole acoustic resonator being spaced apart from one another about the circumferential rotational path of the blade tips in a plane transverse to the rotor axis, the first monopole acoustic resonator and the second monopole acoustic resonator being configured and positioned so as to direct acoustic energy to modify the sound field of the propeller system relative to the aircraft at blade pass or higher harmonic frequency tones.

17. The method of claim 16, wherein the first monopole acoustic resonator and the second monopole acoustic resonator are excited by tip flow of the blade as it passes the opening of the first monopole acoustic resonator and the opening of the second monopole acoustic resonator, respectively.

18. The method of claim 16, wherein the opening of the first monopole acoustic resonator and the opening of the second monopole acoustic resonator are disposed within a distance to the propeller blade tip that is smaller than the wavelength of the propeller's fundamental blade tone and proximate to the rotor plane.

19. The method of claim 16, wherein the first monopole acoustic resonator and the second monopole acoustic resonator each comprise a quarter wavelength resonator.

20. The method of claim 16, further comprising:
directing acoustic energy, via at least one additional monopole acoustic resonator having an opening disposed proximate the propeller blade tip, the first monopole acoustic resonator, the second monopole acoustic resonator, and the at least one additional monopole acoustic resonator being spaced apart from one another about the circumferential rotational path of the blade tips in the plane transverse to the rotor axis, said at least one additional monopole acoustic resonator being configured and positioned so as to direct acoustic energy to modify the sound field of the propeller system relative to the aircraft at blade pass or higher harmonic frequency tones.

21. The method of claim 20, wherein the at least one additional monopole acoustic resonator is excited by tip flow of the blade as it passes the opening of the at least one additional monopole acoustic resonator.

22. The method of claim 20, wherein the opening of the at least one additional monopole acoustic resonator is disposed within a distance to the propeller blade tip that is smaller than the wavelength of the propeller's fundamental blade tone and proximate to the rotor plane.

* * * * *